United States Patent [19]

Hirabayashi et al.

[11] Patent Number: 4,949,083
[45] Date of Patent: Aug. 14, 1990

[54] COMMUNICATION SYSTEM

[75] Inventors: Yuji Hirabayashi, Aichi; Yoshihisa Sato, Nagoya; Susumu Akiyama, Kariya; Katsonori Ito, Aichi; Takao Saito, Nagoya; Tetsuo Tanigawa, Toyota, all of Japan

[73] Assignees: Nippondenso Co., Ltd., Kariya; Toyota Jidosha Kabushiki Kaisha, Toyota, both of Japan

[21] Appl. No.: 195,624

[22] Filed: May 18, 1988

[30] Foreign Application Priority Data

May 21, 1987 [JP] Japan ................... 62-124151

[51] Int. Cl.$^5$ ............................................. H04J 3/00
[52] U.S. Cl. ...................... 340/825.050; 340/825.500; 370/85.5
[58] Field of Search ................. 340/52 R, 22, 825.5, 340/825.05, 438, 459, 825.08, 825.16, 825.06; 370/85, 86, 89, 70, 79; 307/10 R, 10.1

[56] References Cited

U.S. PATENT DOCUMENTS

| 4,058,681 | 11/1977 | Imaizumi et al. | 370/85 |
| 4,506,360 | 3/1985 | Kryskow, Jr. et al. | 370/89 |
| 4,516,121 | 5/1985 | Moriyama et al. | 340/825.05 |
| 4,700,185 | 10/1987 | Balph et al. | 370/85 |
| 4,715,031 | 12/1987 | Crawford et al. | 340/825.5 |

FOREIGN PATENT DOCUMENTS 57-208746 12/1982 Japan .
61-208336 9/1986 Japan .

OTHER PUBLICATIONS

"Multiplexed Data Link with Token Passing" by Tamas I. Pattantyus International Congress and Exposition; Detroit, Mich.; Feb. 23-27, 1987; SAE Technical Paper Series pp., 29-33.

Primary Examiner—Donald J. Yusko
Assistant Examiner—Dervis Magistre
Attorney, Agent, or Firm—Cushman, Darby & Cushman

[57] ABSTRACT

A communication system includes a plurality of separate transmission units. A common signal line connects the units. A token is transferred from a first of the units to a second of the units during one sequence. The token is a right to output data to the common signal line. When the token is rejected by the second unit, the token is retransferred from the first unit at maximum a predetermined number of times during that sequence to the second unit. When the retransferred token is rejected by the second unit, the token may be transferred from the first unit to a third of the units during that sequence. In a next sequence, said predetermined maximum number of times said token is retransmitted to said second unit is then reduced.

7 Claims, 6 Drawing Sheets

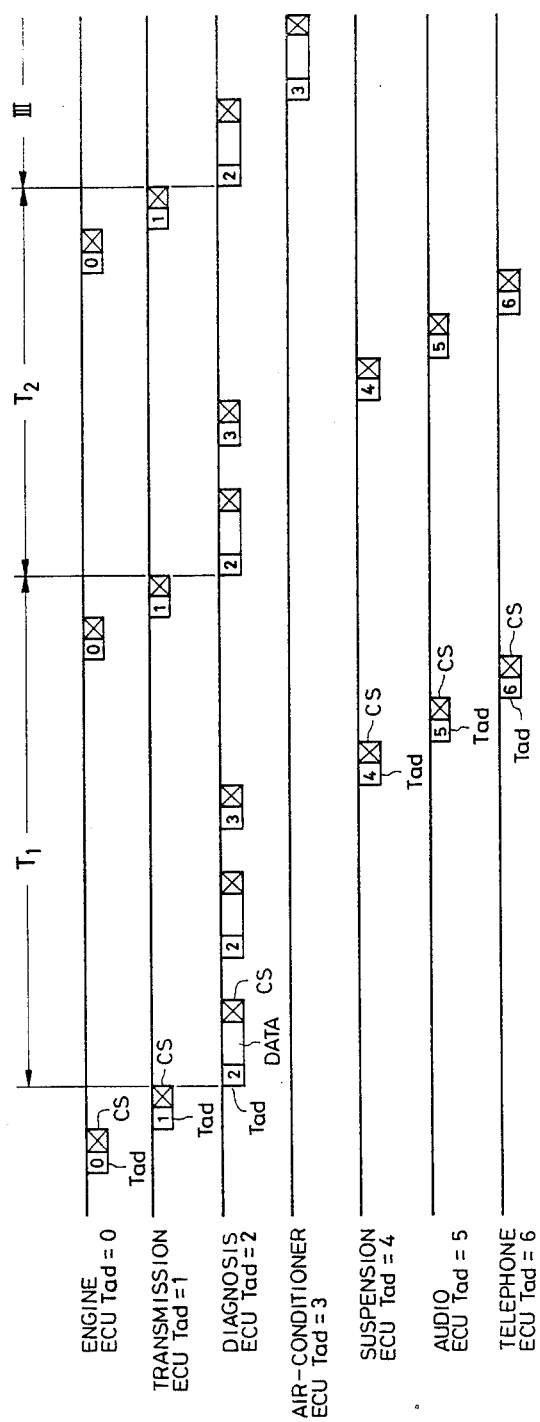

COMMUNICATION SYSTEM

BACKGROUND OF THE INVENTION

This invention relates to communication between control units.

In some cases, separate electronic control devices including microcomputers are connected via a common data link to provide communication therebetween. For example, in some modern automotive vehicles, separate microcomputer-based control devices such as an engine control unit, a transmission control unit, and a shock absorber control unit, are connected via a common data link to communicate with each other. In such an automotive communication system, sensors detecting control parameters are generally connected to nearest control units respectively. Control data signals derived through the sensors are transmitted between the control units via the common data link. In the case of communication of the token bus type, transmission rights (called "tokens") to send data signals are circulated through the control units in a predetermined sequence or pattern.

SUMMARY OF THE INVENTION

It is an object of this invention to provide a reliable communication system.

It is another object of this invention to provide an efficient communication system.

A first communication system of this invention includes a plurality of control units connected to a common signal line to form a data link. At least one of the control units includes a token transfer device for, after a token is accepted via the data link and a given control process is performed, outputting a token transfer signal to the common signal line. The token transfer signal is intended to transfer a token to one of the other control units which is designated in accordance with a given sequence of transfer of the token. The token is a right to send data to the common signal line. The token transfer device includes a token retransfer control device for, in cases where the token is rejected by said one of the other control units even when the token transfer signal is outputted, performing a token retransfer process including a sub process where the token transfer signal is reoutputted to the common signal line. In cases where the token is rejected by said one of the other control units even when the token transfer signal is reoutputted, a memory device memorizes a rejection signal representative of said one of the other control units. During a token transfer process after a next token is accepted, a token retransfer change device changes contents of the token retransfer process when the rejection signal is memorized in the memory device.

A second communication system of this invention is mounted on a vehicle and includes a plurality of control units connected to a common signal line to form a data link. A power supply device activates a first group of control units selected from the control units in a first power supply mode, and activates a second group of control units selected from the control units in a second power supply mode. The first group and the second group are different. One of the first and second power supply modes is selected. At least one of the control units includes a token transfer device for, after a token is accepted via the data link and a given control process is performed, outputting a token transfer signal to the common signal line. The token transfer signal is intended to transfer a token to one of the other control units. The token is a right to send data to the common signal line. The token transfer device is operative to determine said one of the other control units in accordance with the selected power supply mode.

A third communication system of this invention includes a plurality of separate units connected via a common signal line. A token is transferred from a first of the units to a second of the units. The token is a right to output data to the common signal line. When the second unit rejects the token, the token is retransferred from the first unit to the second unit.

BRIEF DESCRIPTION OF THE DRAWINGS

FIGS. 5 and 6 are diagrams showing conditions of transfer of tokens in the communication system of FIG. 2.

DESCRIPTION OF THE BASIC EMBODIMENT

Figure 1:
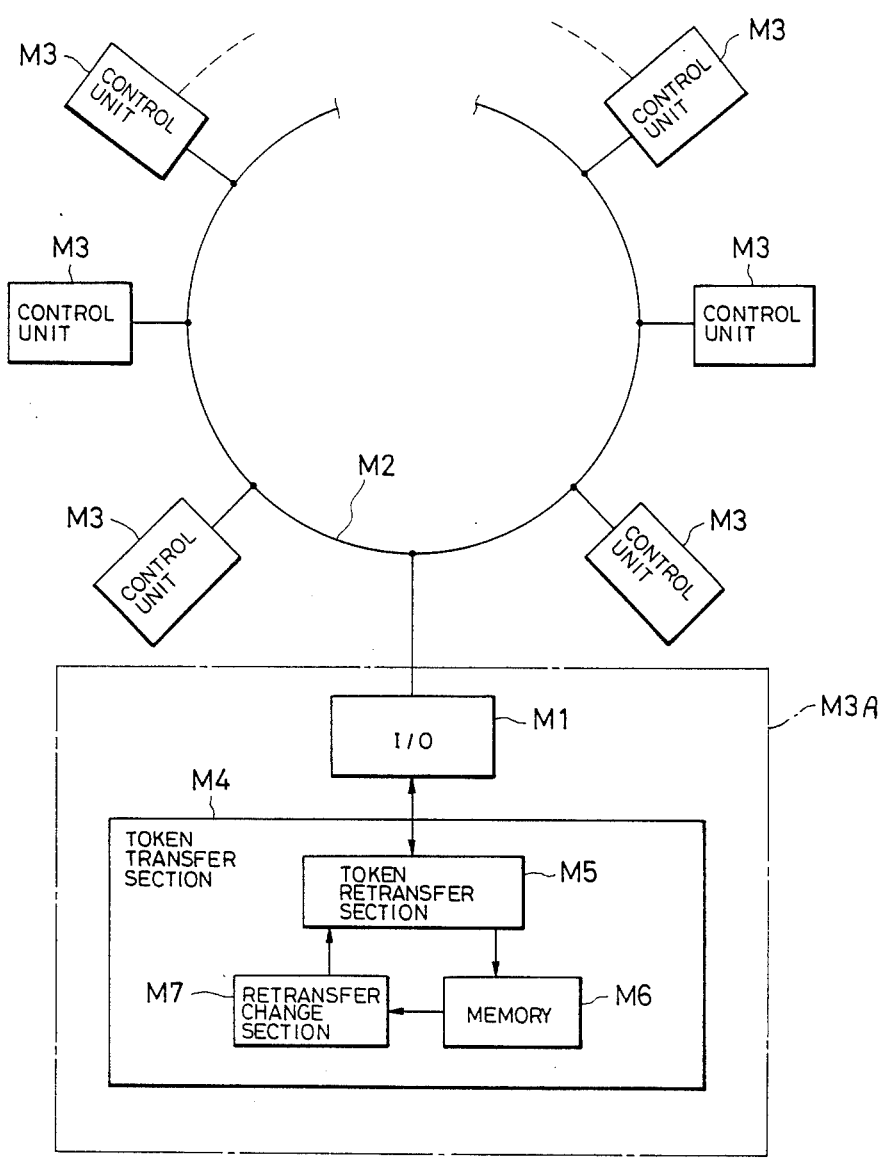
FIG. 1 is a diagram of a communication system according to a basic embodiment of this invention.

As shown in FIG. 1, a communication system includes a common signal line M2 connecting separate control units M3 to form a data link. The control units M3 generally have similar communication portions.

One control unit M3 a includes a communication input/output (I/0) section Ml and a token transfer section M4. The I/0 section M1 is connected between the common signal line M2 and the token transfer section M4. Thus, when a control unit M3 receives a token, which is a right to send a data signal to the common signal line M2, from the data link via the I/0 section M1, the unit M3 performs a given control. After the control unit M3 performs the given control, the token transfer section M4 of control unit M3A outputs a token transfer signal to the data link via the I/0 section Ml, the token transfer signal being directed to another control unit M3 designated or selected in accordance with a preset transfer sequence of the token.

The token transfer section M4 includes a combination of a token retransfer section M5, a memory M6, and a token retransfer change section M7. The token retransfer section M5 is connected to the I/0 section Ml. When an outputted token is rejected by the designated control unit M3, the token retransfer section M5 allows a token to be outputted to the same control unit M3 again. When the reoutputted token is rejected by that control unit M3 a given number of times, the memory M6 inputs and holds a signal representing that control unit M3. Accordingly, the memory M6 holds a signal representing the control unit M3 which rejected a token the given number of times. During a token transfer process, when the memory M6 holds a signal representing the control unit M3 which rejected a token the given number of times, the token retransfer change section M7 varies the contents of a token retransfer process effected by the token retransfer section M5.

In the case where the common signal line M2 is composed of a serial line and thus data signals transmitted along the signal line M2 are in a serial form and an internal part of each control unit M3 processes data signals in a parallel form, the I/0 section M1 may include serial-to-parallel and parallel-to-serial converters which change data signals between serial digital forms and parallel digital forms.

As described previously, the token transfer section M4 serves to transfer a token to another control unit M3 designated in accordance with the preset token trasfer sequence. The token transfer section M4 performs that token transfer by outputting a token transfer signal to the common signal line M2. The token transfer signal may be an address signal representing a preset address (token address). In the case where the control units M3 are identified by different addresses, the token transfer section M4 may increment or decrement the address of the received token signal and then output the incremented or decremented address signal as a token transfer signal.

The token retransfer section M5, the memory M6, and the token retransfer change section M7 may be composed of respective discrete circuits. These sections M5-M7 may also be composed of a common arithmetic and logic unit including a suitable device such as a microcomputer.

The token retransfer section M5 repeats the output of a token transfer signal until the designated control unit M3 accepts a token. The number of times of the repeat of this process is limited. When the designated control unit M3 rejects the token a given number of times, the token retransfer section M5 suspends the output of the token transfer signal to the designated control unit M3 and instead outputs a token transfer signal to another control unit M3 which follows the former control unit M3 in the token transfer sequence.

The token retransfer change section M7 controls the limit on the number of times of the repeat of the token signal output from the token retransfer section M5 to the designated control unit M3. In cases where the token remained rejected by the designated control unit M3 during a preceding cycle of the overall operation of the communication system, the token retransfer change section M7 reduces the limit on the number of times of the repeat of the token signal output from the token retransfer section M5 to the designated control unit M3 which is effective in a current cycle of the overall operation of the communication system. This reduction in the limit shortens a wasteful time spent in the token transfer. It should be noted that the rejection of the token by the designated control unit M3 results from various causes such as a malfunction of the control unit M3 or a drop in the power supply voltage applied to the control unit M3. In cases where the token remained rejected by the designated control unit M3 during a preceding cycle of the overall operation of the communication system, the token retransfer change section M7 may prevent the token retransfer section M5 from outputting the token signal to the designated control unit M3 in a current cycle of the overall operation of the communication system.

The memory M6 may be of the type from which memorized contents are cleared when the memory M6 is disconnected from an external power supply. The memory M6 may also be of the type provided with a backup device which allows the memory M6 to continue to hold memorized contents regardless of the disconnection of the memory M6 from the external power supply.

Operation of the communication system will be described hereinafter. As described previously, the control units M3 forms a data link via which a token is circulated or transferred through the units M3 in a given sequence. When the control unit M3 receives a token, the unit M3 performs a preset control. After the preset control is completed, the control unit M3A outputs a token transfer signal via the internal I/0 section M1, the token transfer signal representing a token and being directed to another control unit M3A designated in accordance with the given token transfer sequence. The token transfer section M4 within the control unit M3A controls the token transfer signal. The token transfer section M4 includes the token retransfer section M5, the memory M6, and the token retransfer change section M7.

When a first control unit M3A outputs a token transfer signal to a second control unit M3A designated in accordance with the given token transfer sequence but the token is rejected by the second control unit M3A, the token retransfer section M5 within the first control unit M3A outputs the token transfer signal to the second control unit M3A again.

When the token is rejected by the second control unit M3A again, the token retransfer section M5 within the first control unit M3A outputs a token to a third control unit M3A selected in accordance with the given token transfer sequence. At this moment, the memory M6 within the first control unit M3A inputs and holds a signal representing the second control unit M3A which rejected the token twice.

During a next cycle of the overall operation of the communication system, when the first control unit M3A receives a token, the first control unit M3A operates as follows. In the case where the memory M6 within the first control unit M3A holds the signal representing the second control unit M3A which rejected the token twice during the preceding cycle of the overall operation of the communication system, the token retransfer change section M7 within the first control unit M3A varies the contents of the token retransfer process performed by the token retransfer section M5 within the first control unit M3A. For example, when the second control unit M3A, which rejected the token during the preceding cycle of the overall operation of the communication system, rejects a token also in the current cycle of the overall operation, the token retransfer change section M7 prevents the token retransfer section M5 from retransferring the token to the second control unit M3A in the current cycle of the overall operation and the section M7 forces the section M5 to output a token to the third control unit M3A.

In this way, the token retransfer process depends on whether or not the same control unit M3A rejected a token during two consecutive cycles of the overall operation of the communication system.

DESCRIPTION OF THE SPECIFIC EMBODIMENT

Figure 2:
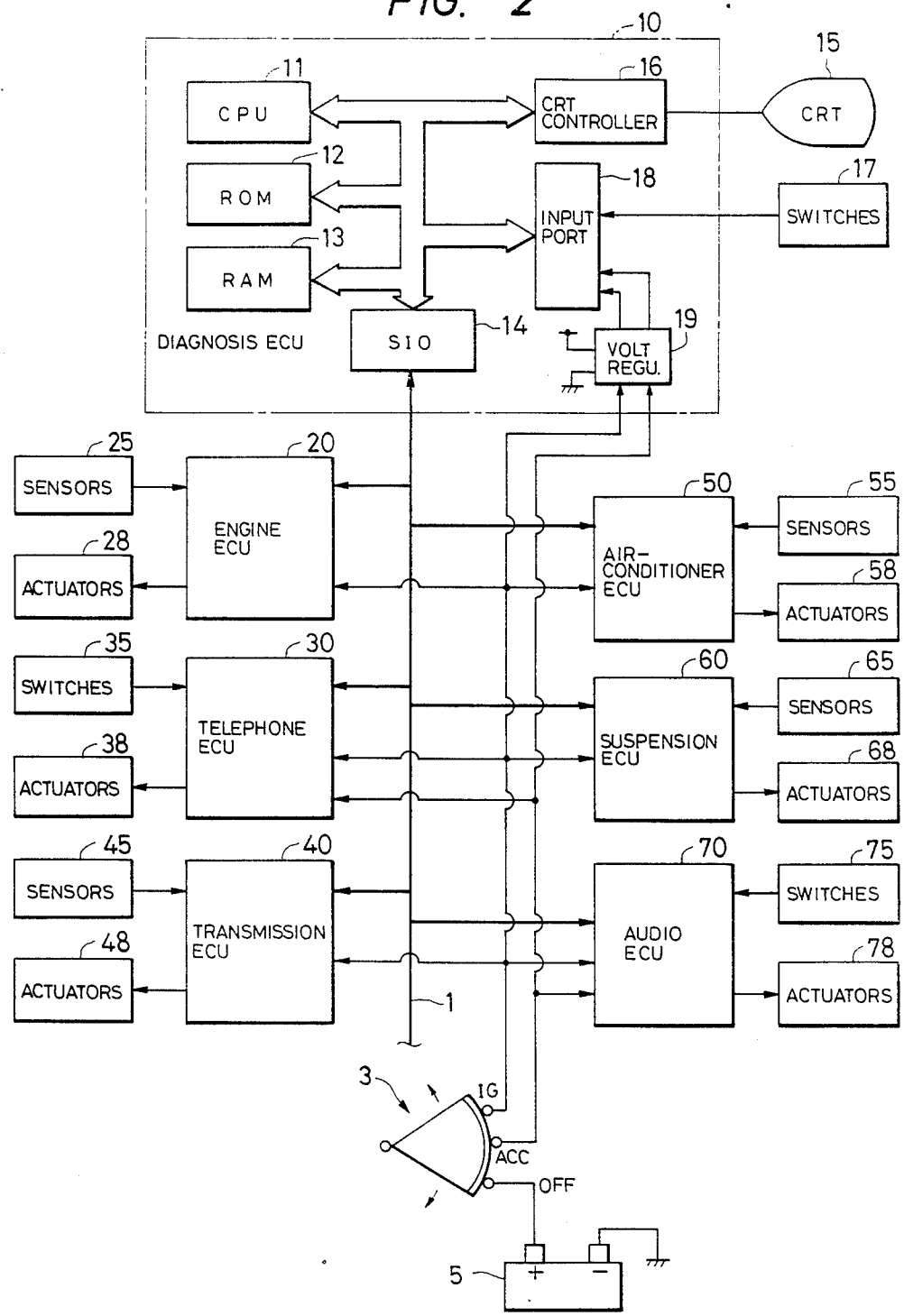
FIG. 2 is s a block diagram of a communication system according to a specific embodiment of this invention.

With reference to FIG. 2, a communication system mounted on a vehicle (not shown) includes a diagnosis electronic control unit (ECU) 10, an engine ECU 20, a telephone ECU 30, a transmission ECU 40, an air conditioner ECU 50, a suspension ECU 60, and an audio ECU 70. The ECUs 10-70 are connected via a common signal line 1 to for a data link. The ECUs 10-70 are connected to a power supply or battery 5 via an ignition switch 3. The ignition switch 3 is movable between IG, ACC, and OFF positions. One or more ECUs are selected and powered by the battery 5 in accordance with power supply modes which depend on the position of the ignition switch 3. The ECUs 10-70 have approximately similar internal hardware structures. It should be noted that the ECUs 10-70 have respective microcomputers which operate in accordance with respective different programs.

The diagnosis ECU 10 monitors operations of the other ECUs and informs a vehicle driver of a malfunction of the other ECUs. The diagnosis ECU 10 includes a logical operation circuit or microcomputer composed of a central processing unit (CPU) 11, a read-only memory (ROM) 12, and a random-access memory (RAM) 13. The diagnosis ECU 10 also includes a serial input-/output (SIO) port 14, a cathode-ray tube (CRT) controller 16, an input port 18, and a voltage regulator 19. The devices 11, 12, 13, 14, 16, and 18 are connected via a bus. The SIO 14 performs input and output of data from and to the common signal line 1. The CRT controller 16 controls a CRT display 15. The input port 18 receives a signal representing states of a set of switches 17 via which instructions are given to the diagnosis ECU 10. The voltage regulator 19 is connected to the battery 5 via the ignition switch 3. When the voltage regulator 19 is supplied with a battery voltage VB from the power source 5, the regulator 19 derives a constant power supply voltage VC from the battery voltage VB. The constant power supply voltage VC is applied to the devices within the diagnosis ECU 10. A signal representing the present power supply mode, that is, the present position of the ignition swich 3, is transmitted to the input port 18 via signal lines connecting the input port 18 and the voltage regulator 19.

The engine ECU 20 controls operating parameters of an engine (not shown) such as the fuel supply rate and the spark timing. The engine ECU 20 inputs data from a set of sensors 25 such as an engine air flow rate sensor and an engine speed sensor, and controls a set of actuators 28 such as fuel injection valves and an igniter. The engine ECU 20 exchanges data with the transmission ECU 40 via the common signal line 1 to finely control the engine, for example, to control the power output of the engine in accordance with vehicle travel conditions transferred from the transmission ECU 40.

The telephone ECU 30 controls a telephone set (not shown). The telephone ECU 30 inputs instructions from a set of switches 35 such as a ten-key and hook switches, and controls a set of actuators 38 such as a call or sound generator. The telephone ECU 30 exchanges data with the audio ECU 70 via the common signal line 1, and lowers the volume on an audio system when the telephone set is used.

The transmission ECU 40 controls a vehicle automatic transmission (not shown). The transmission ECU 40 inputs data from a set of sensors 45 such as a gear shift position sensor and a hydraulic pressure sensor, and controls a set of actuators 48 such as a gear ratio change valve in accordance with the input data.

The air conditioner ECU 50 controls an air conditioner (not shown). The air conditioner ECU 50 inputs data from a set of sensors 55 such as a vehicle interior temperature sensor, a vehicle exterior temperature sensor, and an air flow mode detector. The air conditioner ECU 50 controls a set of actuators 58 such as a compressor, a blower motor, and a damper drive motor in accordance with the input data. The air conditioner ECU 50 outputs data to the engine ECU 20 via the common signal line 1, the data representing an idle up requirement which orders an increase in the engine idle speed.

The suspension ECU 60 changes characteristics of vehicle suspensions in accordance with vehicle travel conditions. The suspension ECU 60 inputs data from a set of sensors 65 such as vehicle height sensors, and controls a set of actuators 68 such as hydraulic valves in accordance with the input data. The engine ECU 20 informs the suspension ECU 60 of an abrupt closing of a vehicle throttle valve via the common signal line 1. When the suspension ECU 60 is informed of the abrupt closing of the vehicle throttle valve, the suspension ECU 60 changes shock absorbers into hard states.

The audio ECU 70 controls an audio system (not shown) mounted within the vehicle. The audio ECU 70 inputs instructions or designations from a set of switches 75 such as a radio receiver tuning switch, a volume setting switch, a tape device control switch, and a CD player control switch. The audio ECU 70 controls a set of actuators 78 in accordance with the input instructions or designations, the actuators 78 adjustably determining the tuning and the volume.

The ECUs 10-70 are identified by different addresses (token addresses) in data communication. Specifically, addresses "2", "0", "6", "1", "3", "4", and "5" are allotted to the diagnosis ECU 10, the engine ECU 20, the telephone ECU 30, the transmission ECU 40, the air conditioner ECU 50, the suspension ECU 60, and the audio ECU 70 respectively.

When the ignition switch 3 assumes the OFF position, all the ECUs 10-70 are deactivated. When the ignition switch 3 assumes the IG position, all the ECUs 10-70 are powered. When the ignition switch 3 assumes the ACC position, the diagnosis ECU 10, the telephone ECU 30, and the audio ECU 70 are powered but the other ECUs are deactivated.

A token is circulated through or transferred cyclically along the ECUs 10-70 by periodically changing the token address. In the case where the ignition switch 3 is in the IG position, the token address is periodically incremented by "1" until the token address reaches "6" and then the token address is returned from "6" to "0", so that the token is transferred cyclically along the engine ECU 20, the transmission ECU 40, the diagnosis ECU 10, the air conditioner ECU 50, the suspension ECU 60, the audio ECU 70, and the telephone ECU 30. When the ignition switch 3 is in the ACC position, the token is transferred cyclically along the diagnosis ECU 10, the audio ECU 70, and the telephone ECU 30.

Figure 3:
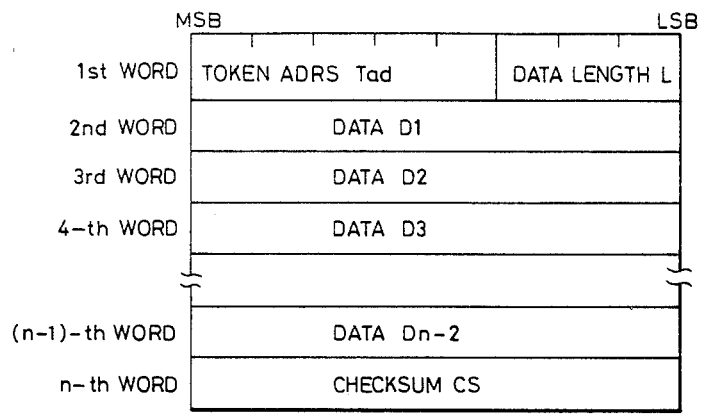
FIG. 3 is a diagram of a format of transmitted data in the communication system of FIG. 2.

Token addresses Tad represent numbers preallotted to the respective ECUs 10-70. The token address Tad is data located in a head of a data block or message outputted from each ECU which accepted a token. The data outputted from each ECU has a preset format in which, as shown in FIG. 3, a first word to an n-th word are arranged sequentially. The letter "n" denotes a given natural number. The higher 5 bits of the first word correspond a token address Tad. The lower 3 bits of the first word represents the word length (n−2) of the data. The second word to the (n−1)-th word represent data D1 to Dn−2 which are sent to another ECU. The data D1 to Dn−2 represent various information such as the current vehicle speed. The second word may represent a token address of an ECU which should receive data. The n-th word represents a checksum CS. The checksum CS is chosen so that the sum of the values represented by the respective words in the message equals a value FF of a sexadecimal system. In other words, the sum of the value represented by the header HD, the values represented by the data D1 to Dn−2, and the value represented by the checksum CS equals the value FF. Each ECU determines whether or not a transmitted message is correct on the basis of the checksum CS.

In respect of the ECUs except the engine ECU 20, when the token address Tad in data outputted to the common signal line 1 represents a number "N", an ECU identified by the address "N+1" is to accept a token next. When the token address Tad in data outputted to the common signal line 1 represents a number "6", the engine ECU 20 identified by the address "0" is to accept a token next.

Figure 4:
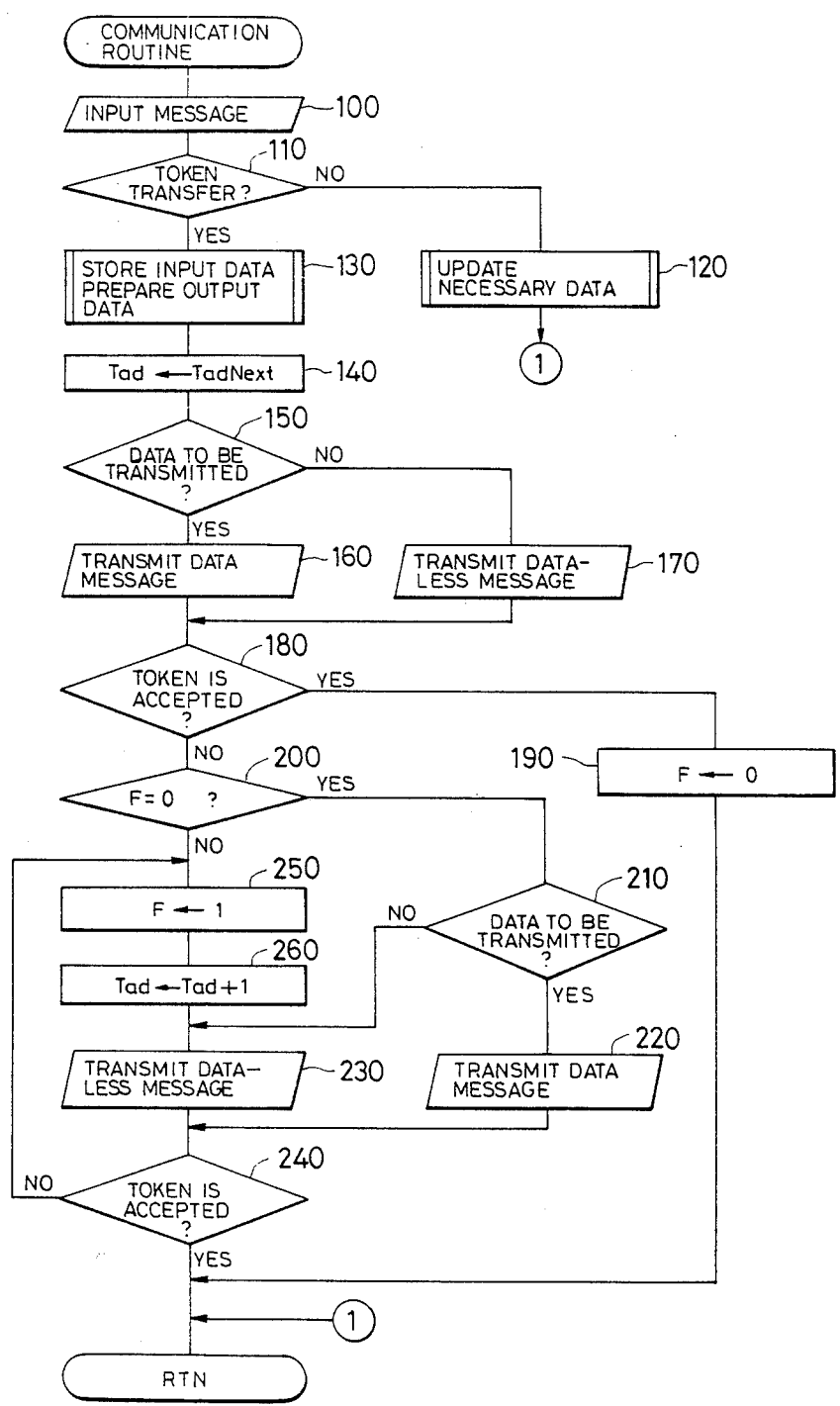
FIG. 4 is a flowchart of a communication control program operating the diagnosis ECU of FIG. 2.

The diagnosis ECU 10 operates in accordance with a program stored in the internal ROM 12. This program includes a main routine for diagnosis and a subroutine for communication control. FIG. 4 is a flowchart of the communication control routine. It should be noted that communication control operations of the other ECUs 20–70 are performed in accordance with communication control routines similar to the communication control routine of the diagnosis ECU 10.

As shown in FIG. 4, a first step 100 of the communication control routine inputs a message from the common signal line 1.

A step 110 subsequent to the step 100 extracts a token address Tad from the input message. The step 110 compares the extracted token address Tad with the token address "1" which equals the address "2" of the diagnosis ECU 10 minus "1". In other words, the step 110 determines whether or not a token is to be accepted. When the extracted token address Tad differs from "1", that is, when the token is not to be accepted, the program advances to a step 120. When the extracted token address Tad equals "1", that is, when the token is to be accepted, the program advances to a step 130.

The step 120 analyzes data in the input message and extracts a part of the data necessary for the control by the diagnosis ECU 10. For example, in the case where the input message contains information representing a malfunction of another ECU, such malfunction information is extracted and data within the internal RAM 13 are updated in accordance with the extracted malfunction information. After the step 120, the program returns from the communication control routine to the main routine.

The step 130 extracts data from the input message and stores the extracted data into the RAM 13. In addition, the step 130 prepares data to be outputted to the common signal line 1.

A step 140 subsequent to the step 130 sets a token address Tad in order to transfer a token to another ECU designated in accordance with a given sequence of token transfer. As described previously, the token address Tad will be contained in the first word of a message. Specifically, a token transfer address TadNext was previously prepared and stored in the RAM 13. The token transfer address TadNext is used as the token address Tad. Since the address of the diagnosis ECU 10 is "2", the token transfer address TadNext is preset to "2". Accordingly, the step 140 sets the token address Tad to "2".

A step 150 following the step 140 determines whether or not data to be transmitted is present. When the data to be transmitted is present, the program advances to a step 160. When the data to be transmitted is absent, the program advances to a step 170.

The step 160 produces a message. Specifically, the token address Tad given in the step 140 is added or connected to a head of the data prepared in the step 130. In addition, a checksum CS is placed into a last word of the message. The step 160 outputs the messge to the common signal line 1 via the SIO 14. After the step 160, the program advances to a step 180.

The step 170 produces a message composed of only the token address Tad and a checksum CS. The step 170 outputs the message to the common signal line 1 via the SIO 14. After the step 170, the program advances to the step 180.

The step 180 detects or determines whether the next ECU, that is, the air conditioner ECU 10, accepts or rejects the token in the message outputted by the step 160 or 170. Specifically, the step 180 detects whether or not the air conditioner ECU 50 outputs a message to the common signal line 1 in a given interval TA starting from the moment of the output of the message from the diagnosis ECU 10 to the common signal line 1. When the air conditioner ECU 50 outputs a message in the given interval TA, that is, when the air conditioner ECU 50 accepts the token, the program advances to a step 190. When the air conditioner ECU 50 has not outputted a message in the given interval TA, that is, when the air conditioner ECU 50 rejects the token, the program advances to a step 200.

The step 190 sets a flag F to "0". Accordingly, the flag F equal to "0" represents that the transfer of a token to the next ECU has been successful. After the step 190, the program returns to the main routine.

The step 200 determines whether or not the flag F equals "0". When the flag F equals "0", the program advances to a step 210. When the flag F differs from "0", the program advances to a step 250.

The step 210 determines whether or not data to be transmitted is present as the step 150 does. When the data to be transmitted is present, the program advances to a step 220. When the data to be transmitted is absent, the program advances to a step 230.

The step 220 produces a message and outputs the message to the common signal line 1 as the step 160 does. After the step 220, the program advances to a step 240.

The step 230 produces a message and outputs the message to the common signal line 1 as the step 170 does. After the step 230, the program advances to the step 240.

The step 240 detects or determines whether the next ECU, that is, the air conditioner ECU 50, accepts or rejects the token in the message outputted by the step 220 or 230. Specifically, the step 240 determines whether or not the air conditioner ECU 50 outputs a message to the common signal line 1 in a given interval TA starting from the moment of the output of the message from the diagnosis ECU 10 to the common signal line 1. When the air conditioner ECU 50 outputs a message in the given interval TA, that is, when the air conditioner ECU 50 accepts the token, the program returns to the main routine. When the air conditioner ECU 50 has not outputted a message in the given interval TA, that is, when the air conditioner ECU 50 rejects the token, the program advances to the step 250.

The step 250 sets the flag F to "1". Accordingly, the flag F equal to "1" represents that the next ECU rejected a token twice.

A step 260 subsequent to the step 250 increments the token address Tad by "1". After the step 260, the program advances to the step 230. Accordingly, when the air conditioner ECU 50 rejected a token twice, the step 230 outputs a data-less message to another ECU, that is, the suspension ECU 60, which follows the air conditioner ECU 50 in the given token transfer sequence.

The steps 250, 260, 230, and 240 are reiterated when the suspension ECU 60 rejects a token. In this case, a data-less message is outputted to another ECU, that is, the audio ECU 70.

As understood from FIG. 4, in cases where the air conditioner ECU 50 failed to accept a token once due to a cause such as the ingress of noise into the common signal line 1, the diagnosis ECU 10 outputs a message to the air conditioner ECU 50 again. When the air conditioner ECU 50 succeeds in accepting the reoutputted token, the communication control including the token transfer control proceeds normally.

In cases where the air conditioner ECU 50 is wrong or the air conditioner ECU 50 is originally absent from the communication system, a token is rejected by the air conditioner ECU 50 twice. In these cases, a token is transferred to another ECU, that is, the suspension ECU 60, which follows the air conditioner ECU 50 in the given token transfer sequence, and a data-less message is outputted to the suspension ECU 60.

In cases where the suspension ECU 60 is originally absent from the communication system, a token is further transferred to another ECU, that is, the audio ECU 70, which follows the suspension ECU 60 in the given token transfer sequence, and a data-less message is outputted to the audio ECU 70.

When one cycle of the token transfer through the ECUs 10-70 passes, a next cycle of the token transfer starts and a token is returned to the diagnosis ECU 10. During the next cycle of the token transfer, the communication control program of FIG. 4 is executed. In cases where the air conditioner ECU 50 recovered from a malfunction, a token is accepted by the air conditioner ECU 50 and the flag F is reset to "0" by the step 190 during the execution of the communication control program in the next cycle of the token transfer. In cases where a token remains rejected by the air conditioner ECU 50, the flag F was already set to "1" and the program moves along the steps 200, 250, 260, 230, and 240, so that the reoutput of a message to the air conditioner ECU 50 is prevented and a data-less message is outputted to the suspension ECU 60.

Under conditions where the ignition switch 3 is in the IG position, the token transfer is performed as follows.

Figure 5:
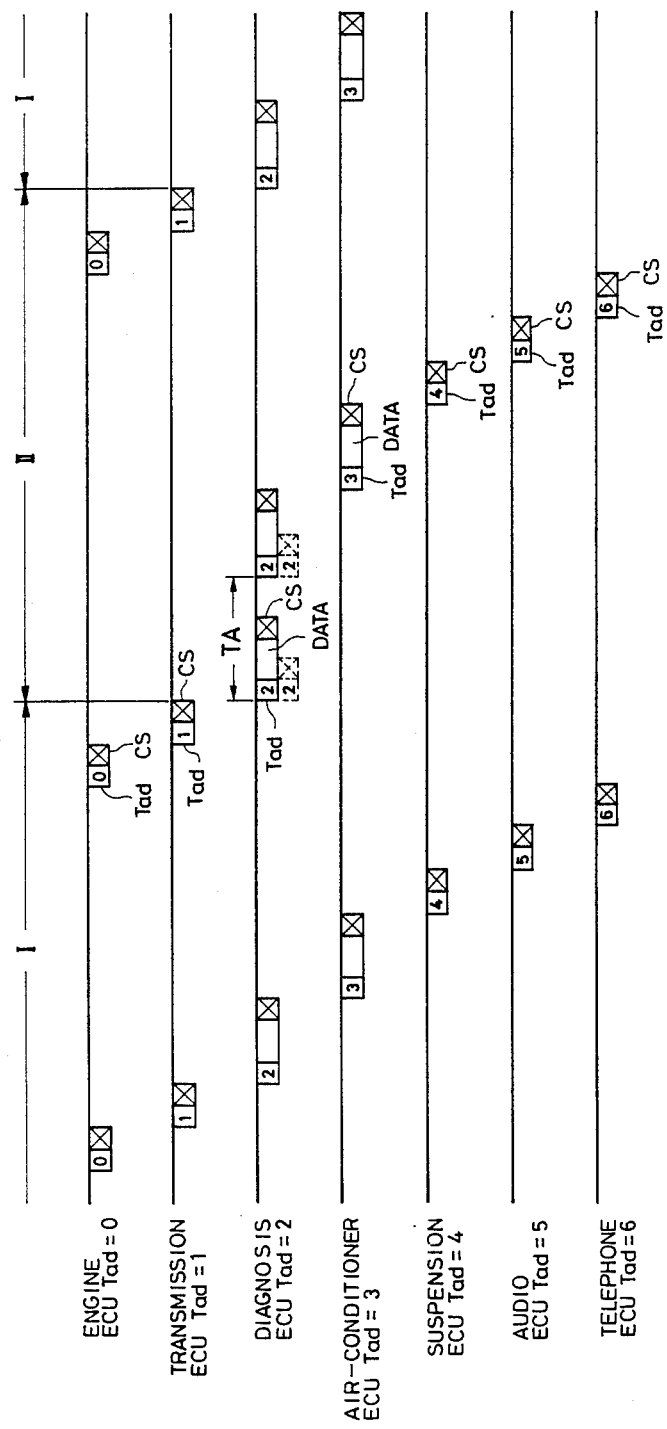

In the case where all the ECUs 10-70 participate in the communication, as shown in the interval I of FIG. 5, the diagnosis ECU 10 outputs a message including data and a token is successfully transferred to the next ECU, that is, the air conditioner ECU 50.

In the case where a token fails to be transferred to the air conditioner ECU 50 due to a cause such as the ingress of noise into the common signal line 1, as shown in the interval II of FIG. 5, the diagnosis ECU 10 reoutputs the message to the air conditioner ECU 50 at a timing which follows the timing of the first output of the message by the given interval TA. When the cause of the failure disappears, the token is successfully transferred to the air conditioner ECU 50 in the second output of the message.

As shown in the interval T1 of FIG. 6, in the case where the token is rejected by the air conditioner ECU 50 again in the second transmission of the message, the diagnosis ECU 10 transfers a token to the suspension ECU 60 and outputs a data-less message to the suspension ECU 60.

During a subsequent period, when the diagnosis ECU 10 accepts a token again, the diagnosis ECU 10 transmits a message to the air conditioner ECU 50 to transfer a token. As shown in the interval T2 of FIG. 6, in the case where the air conditioner ECU 50 stays out of the communication and the token remains rejected by the air conditioner ECU 50, the retransmission of the message to the air conditioner ECU 50 is prevented and a data-less massage is outputted to the suspension ECU 60 to transfer a token to the suspension ECU 60. As shown in FIG. 6, the prevention of the retransmission of the message shortens a time of one cycle of the token transfer from the length T1 to the length T2.

During a subsequent interval III (see FIG. 6), when the air conditioner ECU 50 recovers from a malfunction, the air conditioner ECU 50 accepts a token successfully and the communication proceeds normally.

It should be noted that this embodiment may be modified in various manners. For example, in a first modification of this embodiment, each control unit has a plurality of token addresses.

Figure 7:
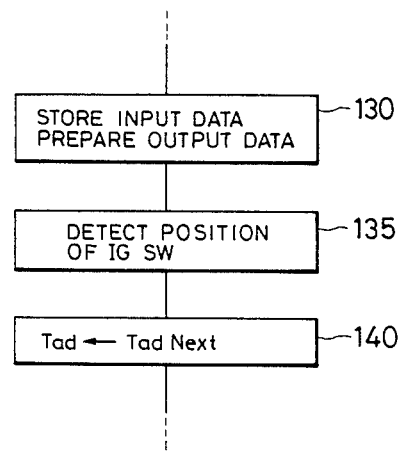
FIG. 7 is part of a flowchart of a modified communication control program operating the diagnosis ECU of FIG. 2.

In a second modification of this embodiment, the communication control program is changed as shown in FIG. 7. Specifically, a step 135 added between the steps 130 and 140 detects the current position of the ignition switch 3. The step 140 is modified so that the address TadNext equal to "2" is used when the ignition switch 3 is in the IG position and that the address TadNext equal to "4" is used when the ignition switch 3 is in the ACC position. Accordingly, a token is transferred from the diagnosis ECU 10 to the air conditioner ECU 50 when the ignition switch 3 is in the IG position. A token is transferred from the diagnosis ECU 10 directly to the audio ECU 70 when the ignition switch 3 is in the ACC position. The telephone ECU 30 is also modified so that, when the ignition switch 3 is in the ACC position, the token is cyclically transferred along the diagnosis ECU 10, the audio ECU 70, and the telephone ECU 30.

What is claimed is:

1. A communication system comprising:
   a plurality of separate data transmission control units for outputting data;
   a common signal line connecting said units;
   means for transferring a token from a first of said units to a second of said units in a first cycle, said token being a right to output said data to said common signal line;
   means for detecting when said second unit rejects said token in said first cycle;
   means for retransferring said token a maximum of a predetermined number of times in said first cycle if said token remains rejected from said first unit to said second unit;
   means for memorizing a rejection signal representing that said token is rejected by said second unit said maximum predetermined number of times in said first cycle; and
   means for decreasing said maximum predetermined number of times of said retransfer of said token from said first unit to said second unit when said rejection signal is memorized during a subsequent cycle token retransfer.

2. The communication system of claim 2 further comprising means for transferring said token from said first unit to a third of said units in said subsequent cycle token retransfer when said retransferred token is rejected by aid second unit said maximum predetermined number of times in said first cycle.

3. A communication system comprising:
a communication signal line;
a plurality of means for transmitting data onto said communication line; and
token transfer control means for controlling a period during which each of said transmitting means can transmit said data on said signal communication line in a repeating predetermined sequence by transferring, without being rejected and in said predetermined sequence, a token, which is a right to transmit said data, to each of said transmitting means, said controlling means comprising:
means for determining if one of said plurality of transmitting means rejects said token in one of said sequences,
means for retransferring during said one sequence said token to said one transmitting means until said token is not rejected, said token being retransferred during said one sequence at maximum a predetermined number of times,
memory means for storing an indication that said one transmitting means rejected said token said maximum number of times during said one sequence, and
retransfer change means for decreasing said predetermined maximum number of times during a next sequence that follows said one sequence for said one transmitting means that caused said indication to be stored in said memory means.

4. A communication system according to claim 3 wherein said token transfer control means further includes means for said one sequence if said one transmitting means rejected said token said maximum number of times.

5. A communication system according to claim 3 wherein said decreased maximum number of times used by said retransfer change means is zero.

6. A communication system according to claim 3 wherein each of said transmitting means has a defined address and said token transfer control means transfers said token between said plurality of transmitting means by varying said defined addresses.

7. A communication system according to claim 3 wherein said memory means stores said indication even when disconnect from an external power supply.

* * * * *

UNITED STATES PATENT AND TRADEMARK OFFICE
CERTIFICATE OF CORRECTION

PATENT NO. : 4,949,083

DATED : August 14, 1990

INVENTOR(S) : HIRABAYASHI et al

It is certified that error appears in the above-identified patent and that said Letters Patent is hereby corrected as shown below:

ON THE FIRST INFORMATION PAGE:

Please Change: (4th inventor only)

"(75) Inventors: Yuji Hirabayashi, . . .    Katsonori Ito, . . . "

to

--(75) Inventors: Yuji Hirabayashi, . . . . Katsunori Ito, . . .--

Signed and Sealed this

Twenty-first Day of January, 1992

Attest:

HARRY F. MANBECK, JR.

*Attesting Officer*                *Commissioner of Patents and Trademarks*